March 9, 1926.  1,576,137
M. O. JOHNSON
APPARATUS FOR CONCENTRATING SOLUTIONS
Filed Sept. 19, 1921  2 Sheets-Sheet 1
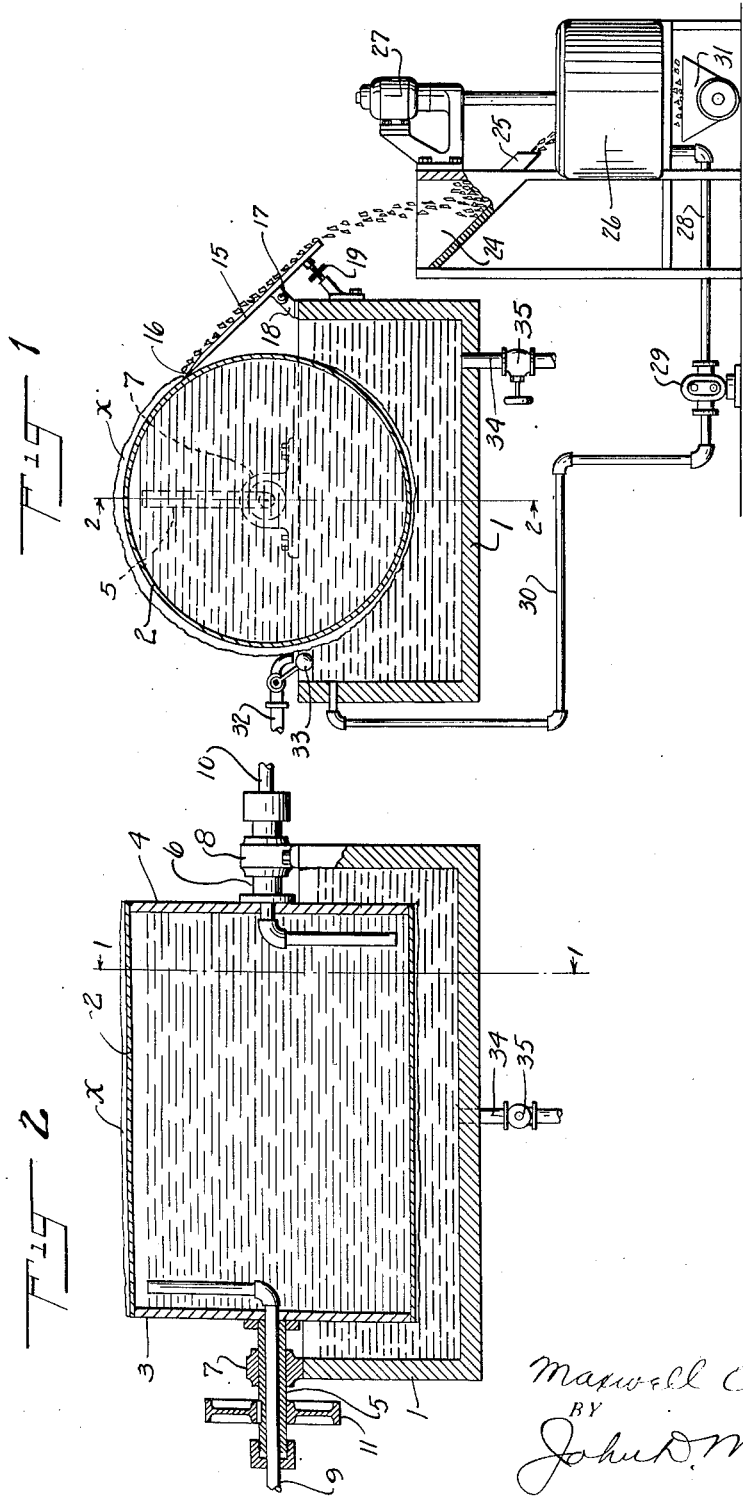

March 9, 1926.

M. O. JOHNSON

APPARATUS FOR CONCENTRATING SOLUTIONS

Filed Sept. 19, 1921

Patented Mar. 9, 1926.

1,576,137

UNITED STATES PATENT OFFICE.

MAXWELL O. JOHNSON, OF WAIPIO, TERRITORY OF HAWAII.

APPARATUS FOR CONCENTRATING SOLUTIONS.

Application filed September 19, 1921. Serial No. 501,856.

*To all whom it may concern:*

Be it known that I, MAXWELL O. JOHNSON, a citizen of the United States, residing at Waipio, in the county of Honolulu, Territory of Hawaii, have invented certain new and useful Improvements in Apparatus for Concentrating Solutions, of which the following is a specification.

The invention relates to a process and apparatus for concentrating liquids or solutions by freezing, and more especially to a process and apparatus for maintaining the freezing surfaces and consequently the freezing action at high efficiency.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel steps, processes, parts, constructions, arrangements, combinations and improvements herein shown and described.

The accompanying drawings, referred to herein and constituting a part hereof, illustrate one embodiment of the invention, and together with the description, serve to explain the principles of the invention.

Of the drawings:

Fig. 1 is a full, transverse vertical section on the line 1—1 of Fig. 2;

Fig. 2 is a longitudinal vertical section taken on the line 2—2 of Fig. 1; and

Figure 3:
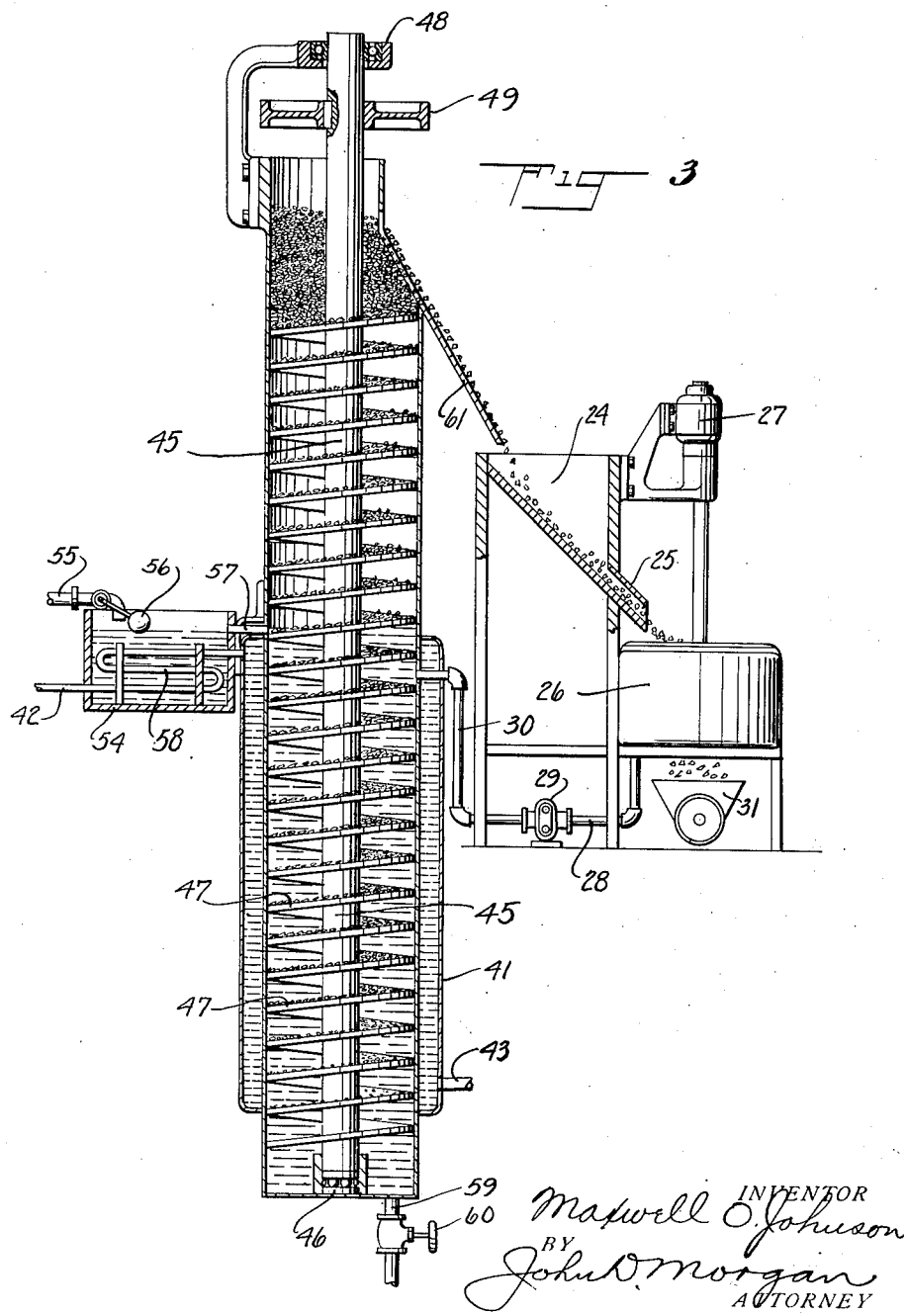
Fig. 3 is a vertical central section of a modified form of the mechanism.

One of the principal objects of the present invention is to provide a rapid concentration of a solution or other fluid by freezing, and this is effected by removing the coating of ice or frozen solvent from the freezing surface before it attains sufficient thickness to seriously or materially impede or impair the transfer of heat from the solution to the refrigerating medium. In addition, the present invention does away with hand labor involved in removing, breaking and otherwise handling the ice or other frozen solvent. It will be understood that the term "solution" herein is used generally to designate any relatively dilute liquid to be concentrated, and the term "solvent" to indicate the diluent, that is, the part thereof which is separated out by the freezing action in order to concentrate the liquid.

As embodied, the refrigerating medium is caused to act upon the solution to be concentrated so that the ice is formed on a traveling or moving surface, from which it is removed, when still of relatively small thickness, and preferably continuously, the ice being thus carried away in relatively small fragments, and the conducting surface between the refrigerating means and the solution is substantially entirely or very largely free from such a coating of ice as would materially impede the transmission of heat in the refrigerating action on the solution.

In the form of the invention shown by way of example in Figs. 1 and 2, the solution to be concentrated is held in a tank or vat 1, and a rotating carrier for the refrigerating medium is partly immersed in the solution in the tank. As embodied, a cylinder 2, having its cylindrical periphery of sheet metal or other efficient heat-conducting material, is provided with heads 3 and 4 from which project hollow shafts 5 and 6, which shafts are conveniently journaled at 7 and 8 upon the top edges of the vat or tank 1.

Through one of these hollow shafts, a pipe 10 for supplying the cold brine or other refrigerating medium, communicates with the interior of the cylinder 2, and through the other hollow shaft passes a discharge pipe 9 for the brine or other refrigerating medium whereby it is carried back to the refrigerating machine. Thus a flow of the refrigerating medium is retained through the cylinder 2. A driving pulley, or other suitable driving device 11, is mounted on the shaft 5 whereby the drum 2 is rotated.

As the drum 2 rotates, a thin sheet of ice is formed on the exterior surface thereof by the action of the refrigerating medium on the solution, and means are provided by the invention for continuously removing this coating of ice from the surface of the cylinder. As embodied, a scraper blade 15 has its edge 16 engaging against the outside of the cylinder 2 for the entire length thereof, thereby removing the coating of ice *x* from the cylinder. The scraper blade 15 at each end thereof is pivotally mounted at 17 upon a standard 18, which standard is mounted conveniently on the edge of the vat or tank 1. A plurality of adjusting wheels 19, or equivalent devices, may be provided to regulate the pressure of the scraper blade 15 upon the surface of the cylinder or drum 2.

In the embodied form of the invention, means are provided, cooperating automatically with the mechanism just described, for separating the solution carried over and removed with the ice by the scraper blade, and for returning it to the tank 1. For this purpose a hopper 24 is provided, which discharges through a chute 25 into a centrifugal 26. Centrifugal 26 is rotated by a motor 27. The separated solution is drawn off by a pipe 28, and by a pump 29 is returned through a pipe 30 into the tank 1. The pure ice or frozen solvent is carried away by a conveyor 31, and may be utilized in a regenerative process as is fully described in my copending application Ser. No. 501,855, filed Sept. 19, 1921.

Means are provided for automatically supplying fresh solution to the tank, and as embodied a pipe 32 is provided with a float-valve 33, whereby the solution will be supplied to the tank to keep it at the desired level. When the solution in the tank 1 is sufficiently concentrated, it may be drawn off through the pipe 34, which is supplied with a valve 35, and the tank 1 may be refilled with the dilute solution.

The transfer of heat through the drum 2 is quite rapid due to the continuous removal of the frozen solvent from the surface of the drum. If desired also, the drum may be immersed more deeply in the solution, thereby offering a larger heat transferring surface. If desired also, a heat insulating covering may be provided over the tank and cylinder. It will be understood that a battery of the tanks and cylinders may be provided, if desired, all delivering to a single centrifugal.

In Fig. 3 of the drawings, a different form of mechanism, operating more or less in the same manner, is illustrated. As embodied, a cylinder 40, disposed either vertically or at a desired inclination, is provided, and for a portion of its length this cylinder is surrounded by a jacket 41 within which is circulated cold brine or other refrigerating medium. As shown, the refrigerating medium is supplied through a pipe 43 into the jacket 41 and is discharged therefrom through a pipe 42.

In this mechanism the ice is formed on the interior surface of the cylinder 40, and means are provided for continuously removing it therefrom and conveying it away out of the cylinder 40. As embodied, there is a shaft 45 within and centrally longitudinally of the cylinder 40. This shaft is provided with a bearing 46 at the bottom of the cylinder. About shaft 45 is formed a conveying screw 47, the outer periphery of which fits snugly against the inner wall of the cylinder 40. The shaft 45 is provided also with a bearing 48 at its top end, and a belt pulley 49 or other equivalent device serves to rotate the shaft.

Means are provided for supplying the dilute solution to the cylinder 40, and in accordance with one feature of the invention this operates continuously. As embodied, a tank 54 is supplied with dilute solution by a supply pipe 55, a float valve 56 serving to keep the solution in the tank 54 at a constant level. A pipe 57 supplies the solution to the cylinder 40.

For the purpose of pre-cooling the dilute solution, the brine pipe 42 is formed into a coil 58 within the tank 54.

The operation of the device is substantially as follows:—

The ice forming on the interior of the cylinder 40 is scraped off and carried away by the slowly revolving screw 47, and any of the concentrated solution adhering to the ice or frozen solvent is washed off by the dilute solution entering through the pipe 57, and is carried back into the cylinder 40. The pipe 59 is provided with a valve 60, and this valve may be set to continuously drain the solution at the desired degree of concentration, or the solution may be drained off intermittently by opening the valve 60, which is otherwise kept closed.

The manner of treating the discharged ice or frozen solvent may be substantially the same as in the mechanism shown in Figs. 1 and 2, and the same reference numerals are applied to the same parts in Fig. 3. A conveying chute 61 serves to convey the ice from the screw 47 to the hopper 24.

The invention in its broader aspects is not limited to the precise manner of practicing the process or to the particular form of apparatus shown and described, but changes may be made therein without departing from the principles of the invention and without sacrificing its chief advantages.

What I claim is:—

1. An apparatus for concentrating solutions by freezing, comprising a container for the solution, a container for a refrigerating liquid, one of the containers being arranged inside the other so that the two liquids are in heat interchanging relationship, means for continuously scraping ice from the walls of the solution container, means for centrifuging the ice and returning the separated solution to the solution container, a feed tank for supplying fresh dilute solution to the container, and means for circulating the refrigerating agent through the feed tank.

2. An apparatus for concentrating solutions by freezing, comprising a container for the solution, a container for a refrigerating liquid, one of the containers being arranged inside the other so that the two liquids are in heat interchanging relationship, means for continuously scraping ice from the walls of the solution container, means for centrifuging the ice and returning the separated solution to the solution container, a feed tank for supplying fresh dilute solution to the container, means for circulating the refrigerating agent through the feed tank, and means in the feed tank for automatically regulating the feed of solution to the solution container.

3. An apparatus for concentrating solutions by freezing, comprising a container for the solution, a container for a refrigerating liquid, one of the containers being arranged inside the other so that the two liquids are in heat interchanging relationship, means for continuously scraping ice from the walls of the solution container, means for centrifuging the ice and returning the separated solution to the solution container, a feed tank for supplying fresh dilute solution to the container, means for circulating the refrigerating agent first through the said container for the refrigerating liquid, and then through the feed tank, and means in the feed tank for automatically regulating the feed of solution to the solution container.

In testimony whereof, I have signed my name to this specification.

MAXWELL O. JOHNSON.